United States Patent [19]

Brindley

BEST AVAILABLE COPY

[11] E Re. 29,047

[45] Reissued Nov. 23, 1976

[54] PUSH BUTTON SWITCHING MODULE FOR FLASHLIGHTS

[75] Inventor: Robert E. Brindley, New York, N.Y.

[73] Assignee: Union Carbide Corporation, New York, N.Y.

[22] Filed: Sept. 29, 1975

[21] Appl. No.: 617,587

Related U.S. Patent Documents

Reissue of:

[64] Patent No.: 3,798,440
Issued: Mar. 19, 1974
Appl. No.: 343,687
Filed: Mar. 22, 1973

[52] U.S. Cl. ..... 240/10.66; 200/60; 200/302; 240/10.67; 240/26

[51] Int. Cl.[2] ..... F21L 7/00

[58] Field of Search ..... 240/10.6, 10.63, 10.65, 240/10.66, 10.67, 10.68, 26; 200/60, 302

[56] References Cited

UNITED STATES PATENTS

| | | | |
|---|---|---|---|
| 1,986,281 | 1/1935 | Nygard | 240/10.67 |
| 2,213,649 | 9/1940 | Goodwin | 200/159 |
| 2,599,254 | 6/1952 | Gits et al. | 240/10.67 |
| 2,837,630 | 6/1958 | Shen | 240/26 X |
| 2,930,886 | 3/1960 | Lennan | 200/60 X |
| 3,162,378 | 12/1964 | Furaya | 240/10.66 |
| 3,172,094 | 3/1965 | Jones | 240/10.63 X |
| 3,226,538 | 12/1965 | Bustamante | 240/10.67 |
| 3,323,118 | 5/1967 | Chan | 240/10.66 X |
| D228,519 | 10/1973 | Moore | D48/24 A |

FOREIGN PATENTS OR APPLICATIONS

| | | | |
|---|---|---|---|
| 1,078,130 | 8/1967 | United Kingdom | 240/10.66 |

OTHER PUBLICATIONS

"Hardware Age," Jan. 1972, p. 139.

*Primary Examiner*—Joseph F. Peters, Jr.
*Attorney, Agent, or Firm*—Cornelius F. O'Brien

[57] ABSTRACT

A switching module for detachably mounting to various size lens and reflector units and battery casings, said module comprising a tubular casing having a lamp-circuit controlled push button switch mounted therein with the button segment facing a flexible boot covered opening in the wall of said casing.

6 Claims, 11 Drawing Figures

PUSH BUTTON SWITCHING MODULE FOR FLASHLIGHTS

Matter enclosed in heavy brackets [ ] appears in the original patent but forms no part of this reissue specification; matter printed in italics indicates the additions made by reissue.

FIELD OF THE INVENTION

This invention relates to a flashlight, such as a waterproof flashlight, and more specifically to a novel waterproof switching module for use in said flashlight.

BACKGROUND OF THE INVENTION

Waterproof flashlights presently available are generally fabricated with magnetically operated switches which are activated from the outside of the flashlight casing. These types of waterproof flashlights generally require a dual type switch arrangement whereby a first switch operating member is disposed outside the water-tight casing which upon being moved will activate a second switch operating member disposed inside said casing. Damage to the outside mounted switch will render the inside switch ineffective to control the operation of the lamp.

Another type of waterproof flashlight utilizes a water-tight flexible rubber member over a slidable switch disposed in a water-tight casing. Repeated use of the slidable switch subjects the rubber member to friction wear and possible damage to its water-tight characteristics.

Waterproof flashlights have also been fabricated with part of a conductive metal switch embedded in the wall of an enclosed casing made of synthetic resin or the like. A second part of the metal switch is exposed on the outside wall of the casing and is coupled to an operating member which controls said exposed switch for activating the flashlight to the "on" and "off" position. The disadvantage with this type flashlight is that the water-tightness of the casing is subject to damage owing to the corrosion of the conductive metal on the switch segment positioned on the outside of the casing. In addition, the operating parts of the switch are rather difficult and expensive to fabricate.

One of the principal objects of this invention is to provide a push button switching module adapted for coupling between a battery casing (or compartment) and a lens housing of a flashlight. Another object is to provide a push button switching module for waterproof flashlight that can be repeatably operated without losing its watertight features.

It is another object to provide a push button switching module which is adapted for use with various type and size battery casings and lens housings.

It is another object to provide a push button switching module for use in floatable waterproof flashlights.

It is another object to provide a push button switching module that is easy to operate and has an attractive appearance. Another object is to provide a push button switching module for flashlights wherein the push button switch is substantially flush mounted in the casing of the module.

These and other objects are accomplished by a push button switching module adapted for coupling between a battery casing and a lens and reflector unit and containing switch means for completing and interrupting the electrical circuit between the battery casing and the lens housing. The switching module can be detachably mounted to the battery casing at one end and the lens and reflector unit at the other end by threaded engagement means, bayonet socket means, or any other suitable securing means.

One embodiment of this invention is a flashlight comprising a battery casing provided with a front open end adapted to receive at least one battery and having means for electrically connecting the bottom vicinity of said battery casing to the vicinity of the front open end; a lens and reflector unit having a front open end, and a lens, a lens ring, a lamp holder containing contact means and a lamp mounted therein; and a switching module adapted at one end to be detachably mounted to the open end of the battery casing and adapted at the opposite end to be detachably mounted to the open end of the lens and reflector unit, said switching module comprising a module casing having a push button switch secured on a mounting bracket both of which are fixedly disposed wholly therein with the button member of said switch aligned with an opening in the wall of the module casing, a flexible boot member disposed and secured over said opening, and means for completing and interrupting the electrical circuit between the battery casing and the lens and reflector unit. Specifically, the flashlight has a battery casing provided with a threaded front open end adapted to receive at least one battery and having a bottom mounted contact spring coupled via a contact strip to a contact ring disposed and secured within said casing at the vicinity of the front open end; a lens and reflector unit having a threaded front open end and including a lamp holder, lamp and contact shell mounted therein; and a switching module adapted at one end to be threadably mounted to the open end of the casing and adapted at the opposite end to be threadably mounted to the lens and reflector assembly. The switching module comprises, in combination, a one piece tubular type modular casing having threaded segments at both ends and an opening in its side wall; a mounting bracket secured in said module casing, said bracket comprising a generally flat surface having an opening therein and circumferentially terminating with an extending substantially annular wall disposed substantially perpendicular to said flat surface, and a support member extending from said flat surface in a direction substantially parallel and opposite to said extending annular wall; a push button switch assembly mounted within said module casing on the support member and disposed with the button element of the switch facing the opening in said module casing; and a flexible boot mounted over said button element and water-tightly secured to the opening in the module casing. The push button switch has at least two contact strips for contacting at least two members selected from the group consisting of the center terminal of the battery adjacent the front end of the battery casing, the terminal of the lamp bulb, the ring contact within the battery casing, and the contact shell in the lens and reflector assembly. For example, the push button switch may have a first contact strip one end of which could protrude through the opening in the flat surface of the mounting bracket so as to be in position to contact the center terminal of the battery adjacent the front end of the battery casing, and the opposite end could extend to contact the terminal of the lamp bulb. A second contact strip could be extended from the push button switch to abut the contact ring within the battery casing while a third switch mounted contact strip could extend into the lens and reflector assembly to abut the contact shell therein. Thus the switch would operate to either couple or uncouple the second and third contact strips thereby completing or breaking, respectively, the circuit for lighting the lamp bulb. Another arrangement would entail having a separate contact strip electrically connecting the contact ring within the battery casing to the contact shell within the lens and reflector assembly. The switch could then contain a first fixedly secured contact strip for abutting the center terminal of a battery and a second fixedly secured contact strip for abutting the terminal of the lamp bulb. Thus the switch could be activated to either couple or uncouple the first and second contact strips thereby completing or breaking, respectively, the circuit for lighting the lamp bulb.

Coupling one end of the switching module of this invention to the threaded opening of the battery casing, and the opposite end to the threaded opening of the lens and reflector assembly, with a suitable O-ring seal at each threaded end face joint, will produce an excellent waterproof floatable flashlight capable of being repeatably operated without loosing its water-tight features. The switching module of this invention is also admirably suited for use with various size and shape battery casings and lens and reflector units to produce flashlights for general purpose use.

Figure 1:
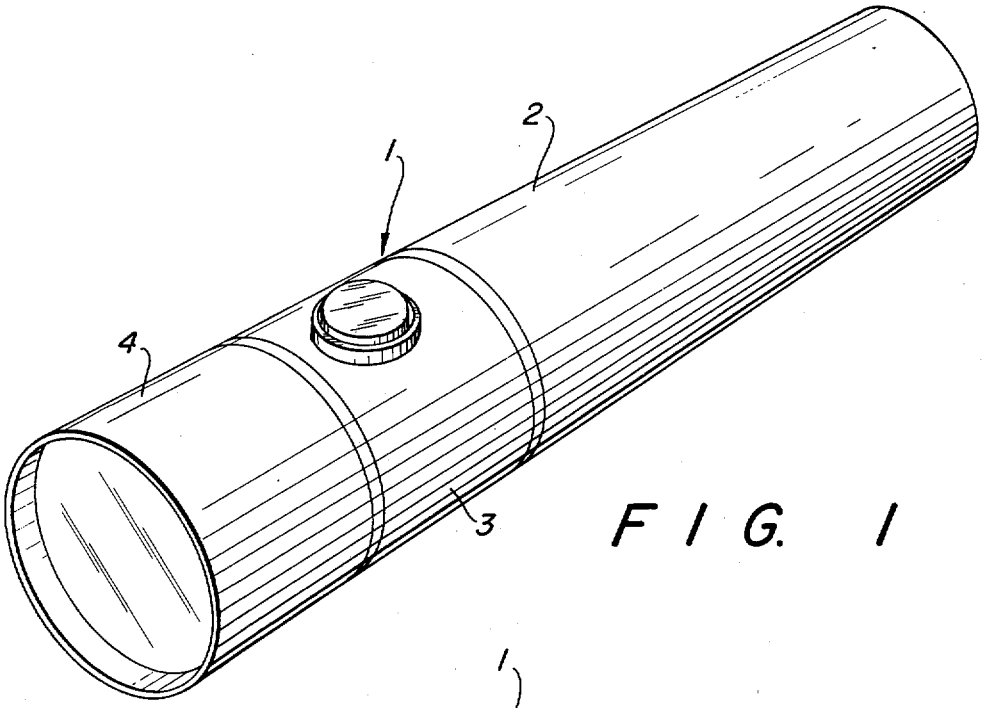
FIG. 1 is an isometric view of a flashlight embodying the invention.
Figure 2:
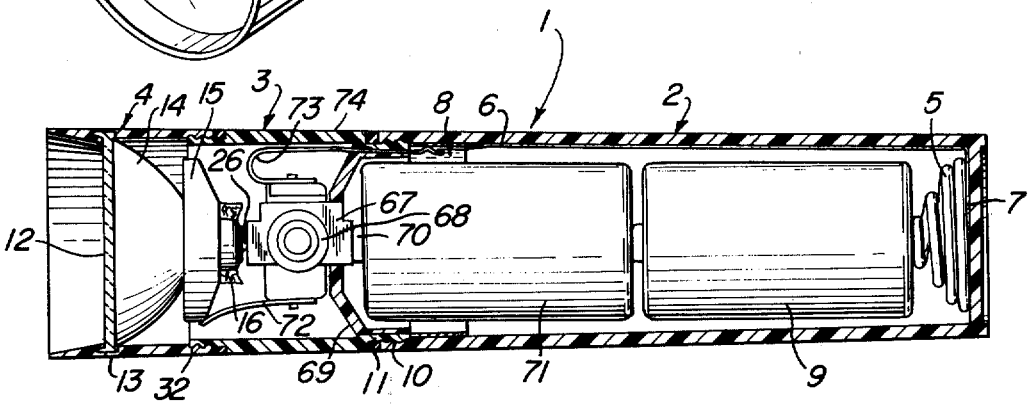
FIG. 2 is a horizontal section of the flashlight of FIG. 1.
Figure 3:
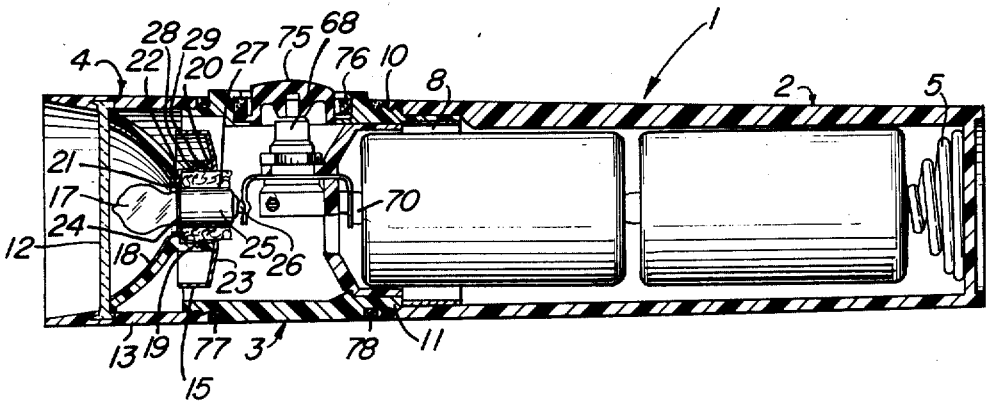
FIG. 3 is a vertical section of the flashlight of FIG. 1.
Figure 2A:
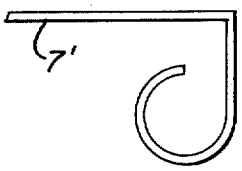
FIG. 2A shows one embodiment of a contact strip for the flashlight of FIG. 2.
Figure 2B:
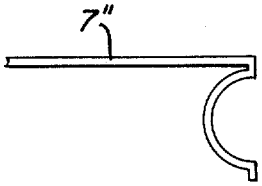
FIG. 2B shows another embodiment of a contact strip for the flashlight of FIG. 2.

Referring in detail to FIGS. 1, 2, and 3, there is shown a flashlight having a battery casing 2, a switching module 3, and a lens and reflector unit 4. The battery casing is preferably molded from a suitable plastic material such as polyethylene, polypropylene, ABS copolymers, or styrene and contains an electrically conductive spiral contact spring 5 disposed in the bottom closed end of the casing. An electrically conductive L-shaped strip 6 is longitudinally disposed against the internal wall of casing 2 with the short extended leg segment 7 contacting spring 5. The opposite end of contact strip 6 abuts and is secured to an electrically conductive contact ring 8 disposed within the open end vicinity of casing 2. The end of contact strip 6 can be spotwelded to contact ring 8 or secured by other suitable techniques such as pressure. Likewise, the segment 7 of contact strip 6 can also be suitably secured to spring 5 by conventional techniques such as spotwelding or pressure. The leg segment 7 of strip 6 may be appropriately bent to provide a curved protrusion 7′ or 7″ as shown in FIGS. 2a and 2b, respectively. The use of such a curvilinear configuration, or any variation thereof, for the leg segment of contact strip 6, would negate the necessity of having contact spring 5 since the protrusion portion of the leg segment would be utilized to contact the bottom disc of battery 9 when placed in the lower portion of casing 2. The open end portion of casing 2 terminates with a threaded segment 10 designed to engage threaded segment 11 of switching module 3.

Lens and reflector unit 4 comprises lens 12, lens ring 13, reflector 14, contact shell 15, bulb holder 16 and lamp 17. Reflector 14 is of the conventional type comprising a molded reflector body composed of a nonconductive material, such as plastic, for instance, polystyrene, and having substantially corresponding concavo-convex sides, the concave side of which is provided with a metallic reflectory coating 18 such as aluminum applied by conventional vacuum-metallizing techniques or the like, and a central apertured cylindrical neck 19. The contact shell 15, composed of an electrically conductive material, is preferably of frusto-conical shape with a tubular socket 20 axially formed therein. The tubular socket 20 is secured within the apertured neck 19 of reflector 14 and has a flanged end 21 which interlocks with an annular flange 22 which is integrally molded to the opening of the apertured neck 19. The frusto-conical portion of contact shell 15 forms an annular shaped skirt 23 which projects radially outwardly from and out of contact with reflector 14. The flanged end 21 of tubular socket 20 also provides a seat against which is mounted the flanged neck 24 of lamp 17 which is of the conventional type having a cylindrical base 25 including a button type terminal 26.

Bulb holder 16 is tubular shaped and is composed of a resilient material, preferably a molded plastic, such as polyethylene. Bulb holder 16 is securely mounted within tubular socket 20 by conventional means and has a socket 27 within which is disposed base 25 of lamp 17. For example, the forward end portion of tubular socket 27 of bulb holder 16 may be formed with a channel or groove 28 which engages with a corresponding peripheral bead portion 29 formed on the inside surface of tubular socket 20 of contact shell 15. The channel or groove 28, and corresponding bead 29, can be of such size and arranged so as to permit the forward end of the bulb holder 16 to be securely snapped into place by merely pushing holder 16 through the rear open end of tubular socket 20 where it will be securely retained. To remove holder 16 to replace lamp 17, the holder is simply pulled outwardly from socket 10 to detach its forward end. Once the lamp is replaced, it is simply pushed back into socket 20. The assembled unit containing reflector 14, contact shell 15, bulb holder 16 and lamp 17 is held securely within the lens and lens ring assembly by friction fit between the reflector rib periphery and a bead within the lens ring. After assembly, the forward opening of the switch module entraps the reflector between its forward thread and the lens.

Figure 4:
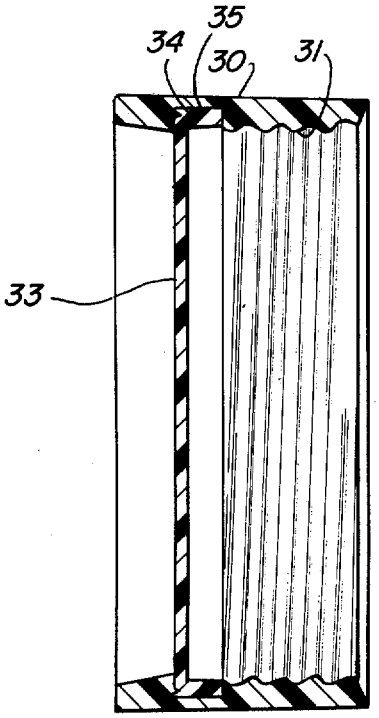
FIG. 4 is an enlarged sectional view of a lens and reflector unit.

The lens and lens ring, shown in FIG. 4, comprises a lens ring 30, preferably molded of a suitable material, such as plastic, for example ABS or polyolefin, which has a threaded segment 31 for engaging with threaded segment 32 (FIG. 2) of switching module 3. The lens 33 can be made of a clear plastic material similar to that of lens ring 30 although lens ring 30 will preferably have various color pigments added to give it an attractive appearance. Lens 33 can be secured water-tightly to lens ring 30 by embedding a peripheral skirt edge 34 of lens 33 into a groove 35 in said lens ring 30 during the molding of lens ring 30. It is also possible to provide a one piece lens and lens ring by molding the lens and ring in one operation. Preferably, the lens could be molded first of a transparent synthetic resin or the like, followed by a second molding operation whereby the lens ring could be molded onto said lens using a translucent or opaque synthetic resin material. This dual molding operation could be easily accomplished by first molding the transparent lens, and then placing the lens within the mold of the lens ring, and then injecting the material for the lens ring around the lens.

Figure 5A:
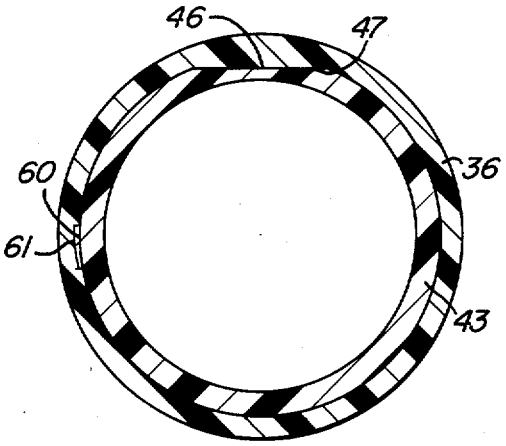
FIG. 5a is a cross-sectional view taken along line A—A of FIG. 5.
Figure 6:
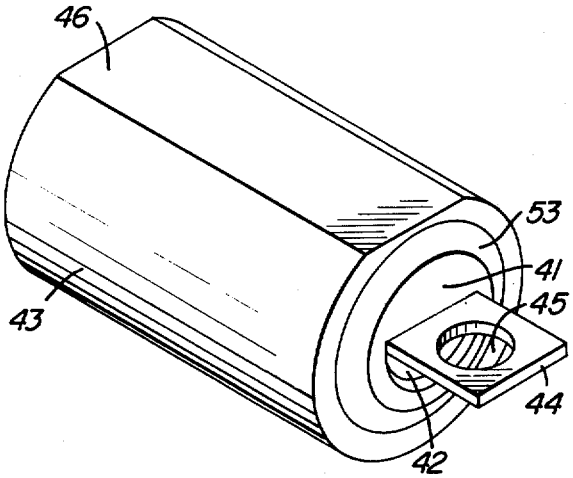
FIG. 6 is an enlarged isometric view of the mounting bracket of FIG. 5.
Figure 5:
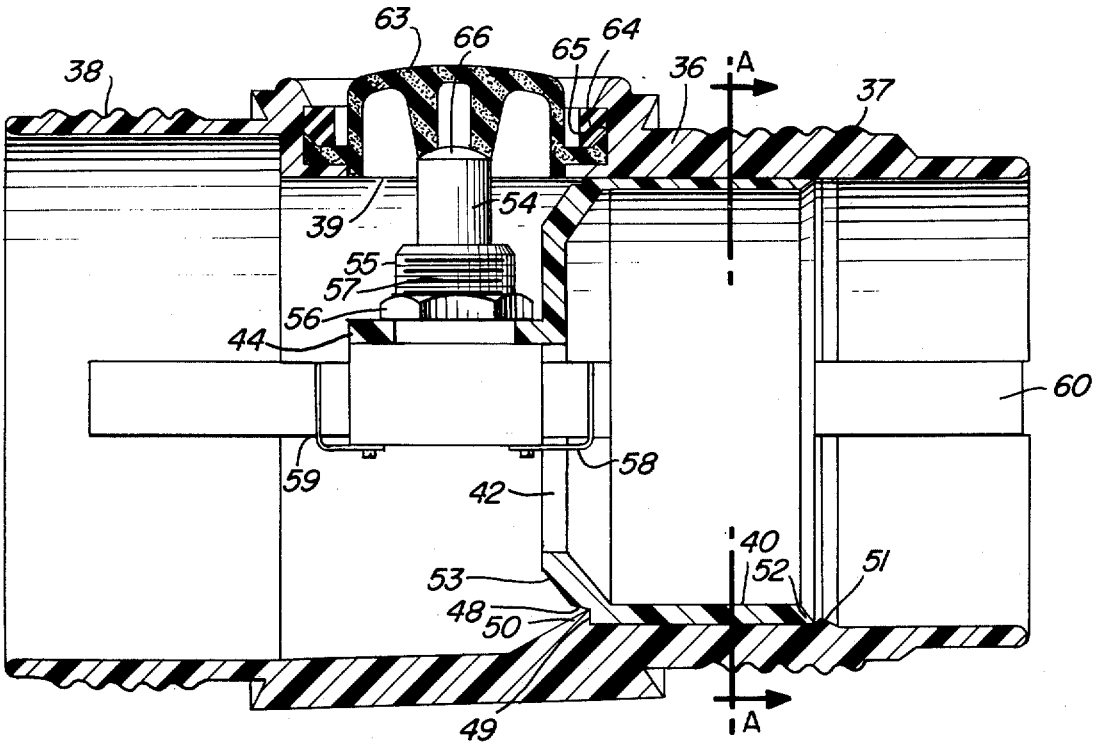
FIG. 5 is an enlarged sectional view of a switching module of this invention.

As shown in FIG. 5, switching module 3 comprises a tubular modular casing 36 having threaded segments 37 and 38 at opposite ends and an opening 39 in its side wall. A mounted bracket 40 is fixedly secured within module casing 36 and as isometrically shown in FIG. 6 comprises a generally flat surface 41 having an opening 42 therein and circumferentially terminating with an extending substantially annular wall 43 disposed substantially perpendicular to surface 41. Support member 44 extends from surface 41 in a direction substantially parallel and opposite to wall 43 and has an opening 45 disposed therein. An outside segment 46 of wall 43 is molded flat to correspond to the internal flat segment 47 of casing 36 as shown in FIG. 5a, which is a cross-sectional view taken along line A—A of FIG. 5. The corresponding or mating flat segments 46 and 47 provide a polarization means for insuring proper alignment of mounting bracket 40 within module casing 36. The outside diameter of wall 43 is slightly smaller at its leading edge 48 so as to provide a circumferential surface 49 which can seat against molded flange or projecting rim 50 on the internal surface of casing 36. A second molded flange or projecting rim 51 is disposed forward of flange 50 on the internal surface of casing 36 and is provided to abut the opposite edge 52 of mounting bracket 40. Thus, mounting bracket 40 can be pushed into module casing 36 until it is fixedly secured between flanges 50 and 51. Although flat surface 41 terminates in a tapered segment 53, it is to be understood that it could be extended radially outwardly so as to form an angle of 90° with edge 48.

Figure 7:
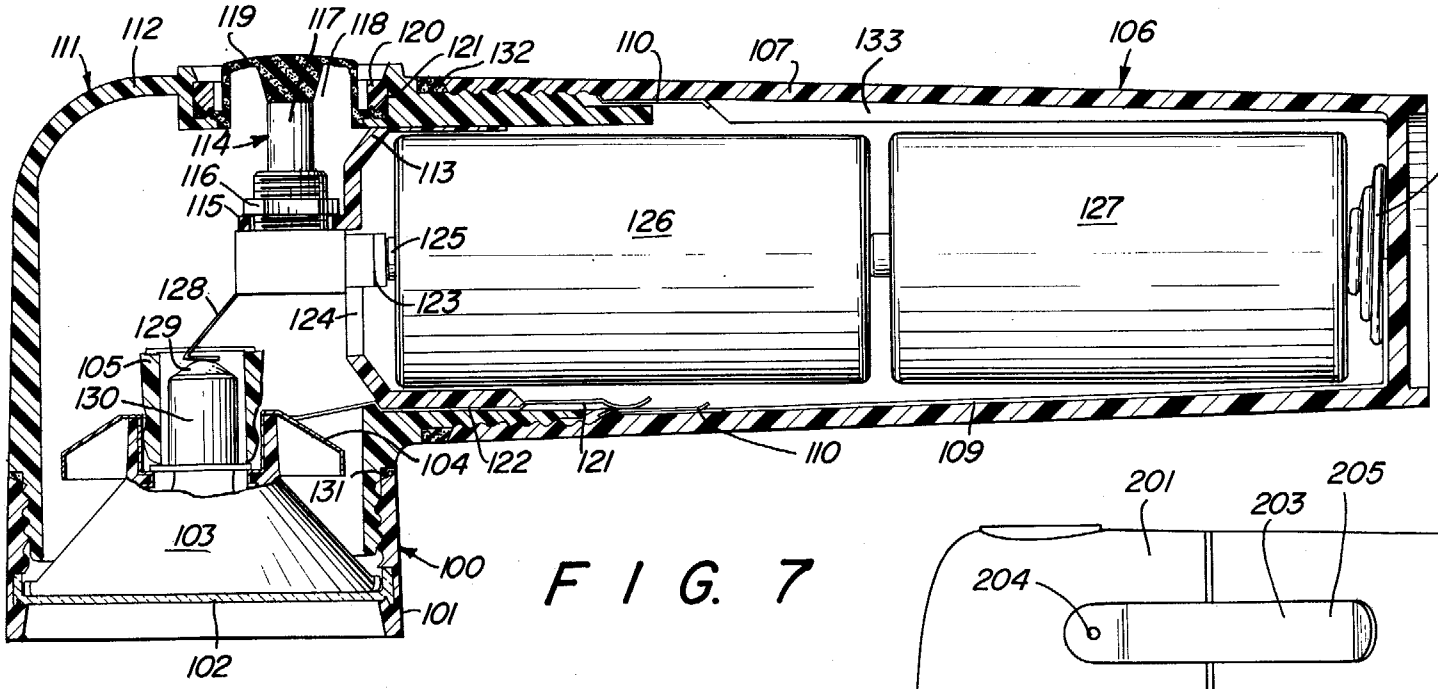
FIG. 7 is a vertical sectional view of an angle head flashlight embodying the invention.

A conventional type push button switch 54 is fixedly mounted to support 44 by placing its shaft member 55 through opening 45 and then securing it in place by screwing nut 56 onto the threaded segment portion 57 of shaft 55. The switch 54 is shown in FIG. 5 with a first contact strip 58 projecting through opening 42 in bracket 40 and positioned so as to be aligned and in contact with the center terminal of a battery as generally shown in FIG. 3. A second contact strip 59 is shown projecting in the opposite direction and positioned so as to be aligned and in contact with the lamp terminal as generally shown in FIG. 3. Thus the activation of the switch 54 will internally couple or uncouple contact strips 58 and 59 thereby electrically connecting or disconnecting, respectively, the battery terminal to the lamp terminal. A third contact strip 60 is disposed in a recess 61 in module casing 36 as shown in FIG. 5a. This contact strip 60 is held in recess 61 by bracket wall 43, and extends in one direction so that it can be in a position to contact the shell member in the lens and reflector unit and in the opposite direction so that it can be in position to contact the ring member in the battery casing as generally shown in FIG. 7. Thus when the switching module shown in FIG. 5 is assembled to a battery casing at one end and a lens and reflector unit as the other end, a flashlight will be produced having a complete electric circuit for operating the lamp.

A flexible switch boot 63, made of rubber, a low density polyolefin, or the like, is assembled above switch 54 in opening 39 of module casing 36. A rigid gasket 64 of ABS or some other rigid metallic like material provides a seal between boot 63 and opening 39 while simultaneously securing boot 63 in a molded recess or groove 65 in module casing 36. This boot and gasket arrangement provides a watertight assembly for switch 54 while also providing the flexibility necessary for activating said switch 54. Thus by depressing flexible boot 63, button 66 of switch 54 can be lowered thereby effectively operating said switch 54.

FIGS. 2 and 3 show a similar type switching module as in FIG. 5 except the contact strips are different. Here a first contact strip 67 extends from switch 68 through the opening in mounting bracket 69 to contact center terminal 70 of battery 71 while the opposite end extends to contact lamp terminal 26 of lamp 17. Thus battery terminal 70 is always connected to lamp terminal 26. Battery 9 contacts spiral spring 5 at one end and the bottom disc of battery 71 at the other end. A second contact strip 72 extends from the switch 68 to contact annular shaped skirt 23 of contact shell 15. A third contact strip 73, disposed in a recess in module casing 74 and held therein by mounting bracket 69 as shown in FIG. 5, extends from switch 68 to contact ring 8 in battery casing 2. Again a flexible boot 75 and gasket 76 are assembled over switch 68 providing a water-tight seal thereat. The depressing of boot 75 will operate switch 68 to either couple or uncouple the ring 8 to skirt 23 via contact strips 72 and 73, thereby completing or breaking, respectively, the circuit for supplying power to the lamp.

To insure a water-tight seal at the threaded engagement areas between one end of switch module 3 and the lens and reflector unit 4, and between the opposite end of switch module 3 and the battery casing 2, gaskets or O-rings 77 and 78, respectively, are added. The gaskets or O-rings could be made of rubber, a low density polyolefin, or the like, as long as such gaskets are water resistant so as to provide a water-tight seal for the threaded areas. The overall assembled flashlight shown in FIGS. 2 and 3 will be water-tight, floatable, and capable of being repeatably operated without loosing its water-tightness.

FIG. 7 shows another embodiment of this invention in a flashlight commonly referred to as an angle-head flashlight. Lens and reflector unit 100 comprises a lens ring 101, lens 102, reflector 103, contact shell 104, lamp 130 and lamp holder 105. These components are similar to those shown in FIGS. 2 and 3 except that the lens ring 101 is slightly shorter. Likewise, battery casing 106 comprises a casing 107, having disposed in its closed end a spiral contact spring 108 in contact with a contact strip 109 secured to a contact ring 110 as described above. In addition, battery casing 106 has longitudinally disposed ribs 133 which are used to center the batteries within the casing. Switching module 111 comprises a curved module casing 112 having mounted therein a mounting bracket 113 fixedly securing a push button switch 114. The threaded segments at the ends of module casing 112 are disposed on axis 90° apart.

Mounting bracket 113 is disposed in module casing 112 as described above in conjunction with FIG. 5. Switch 114 is secured to a support member 115 by nut 116 and is disposed with its button member 117 facing opening 118 in module casing 112. Flexible boot 119 and gasket 120 are securely assembled over opening 118 in molded groove or recess 121 of module casing 112. This boot and gasket assembly provides a water-tight seal for opening 118.

Contact strip 121 is disposed in a molded groove 122 in the internal wall of casing 112 and is held therein by mounting bracket 113. One end of contact strip 121 contacts shell 104 in the lens and reflector unit 100 while the opposite end contacts ring 110 in the battery casing 106. Switch 114 has a first contact strip 123 extending through an opening 124 in mounting bracket 113 and is positioned so as to contact the center terminal 125 of battery 126. Battery 127 contacts spiral spring 108 at one end and the bottom disc of battery 126 at the other end. A second contact strip 128 on switch 114 extends to contact the terminal 129 of lamp 130. Thus switch 114 can be operated to either couple or uncouple, via contact strips 123 and 128, terminal 125 of battery 126 to terminal 129 of lamp 130 thereby closing or opening, respectively, the circuit for delivering power to the lamp. Again gaskets or O-rings 131 and 132 are added to the threaded areas between one end of switching module 111 and lens and reflector unit 100, and the opposite end of switching module 111 and battery casing 106, respectively, to provide a watertight seal for these areas.

Figure 8:
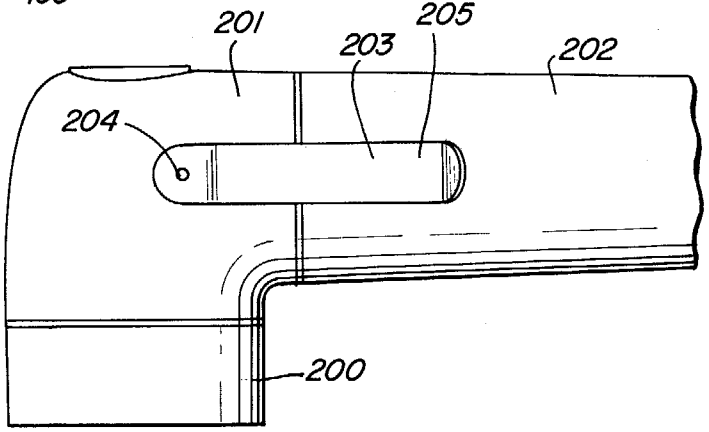
FIG. 8 is a partial side view of an angle head flashlight embodying the invention.

FIG. 8 shows a partial side view of an angle head flashlight having a lens and reflector unit 200, a switching module 201 and a battery casing 202. On the side of switching module 201 is securely mounted a conventional metal or plaster flexible clip 203. The upper end 204 of clip 203 is permanently secured to the switching module by electrical welding, adhesive, or the like, while the lower end 205 of the clips will bear against the body portion of the battery casing 202. The lower end 205 is adapted to be moved away from the body portion to permit that lower end to telescope over a belt or other portion of the apparel of the user of any external narrow object.

Although this invention is directed mainly to a floatable, waterproof flashlight, it is to be understood that the switching module of this invention can be used with different size and shape battery casings and lens and reflector units which may not be floatable or watertight. For example, metal battery casings can be coupled to the switching module of this invention to provide a general type flashlight. Likewise, in some applications, the gaskets at the threaded areas of the flashlight may not be necessary, and the gasket for the switch boot may be dispensed with if the boot is fabricated with a peripheral rim having sufficient thickness so that it can be fixedly secured into the molded recess at the circumference of the opening in the wall of the module casing.

A flashlight constructed in the manner described above would be admirably suited for use in all applications requiring a sturdy, durable lightweight flashlight. Although this invention has been described with reference to many specific details thereof, it is apparent that the invention is not limited to such details.

What is claimed is:

[ 1. A push button switching module adapted for coupling between a battery casing and a lens and reflector unit which comprises a module casing having a push button switch secured on a mounting bracket both of which are fixedly disposed wholly within the module casing with the button member of said switch aligned with an opening in the wall of the module casing, and contact means adapted through activation of the push button switch for completing or interrupting an electrical circuit between said battery casing and said lens and reflector unit. ]

[ 2. The push button switching module of claim 1 wherein a flexible boot member is disposed and secured over the opening in the wall of the module casing where the button member of said switch is aligned, and wherein said switching module has a first threaded open end adapted to be threadably mounted to the battery casing and a second threaded open end adapted to be threadably mounted to the lens and reflector unit. ]

[ 3. The push button switching module of claim 2 wherein the threaded open ends of the module are axially aligned. ]

[ 4. The push button switching module of claim 2 wherein the threaded open ends of the module are disposed on axis spaced 90°apart. ]

[ 5. A flashlight comprising a battery casing provided with a front open end adapted to receive at least one battery and having means for electrically connecting the bottom vicinity of said battery casing to the vicinity of the front open end; a lens and reflector unit having a front open end and including a lens, a lens ring, a lamp holder containing contact means, and a lamp mounted therein, and a switching module adapted at one end to be detachably mounted to the open end of the battery casing and adapted at the opposite end to be detachably mounted to the open end of the lens and reflector unit, said switching module comprising a module casing having a push button switch secured on a mounting bracket both of which are fixedly disposed wholly within the module casing with the button member of said switch aligned with an opening in the wall of the module casing, and contact means adapted through activation of the push button switch for completing or interrupting an electrical circuit between the battery casing and the lens and reflector unit. ]

[ 6. The flashlight of claim 5 wherein a flexible boot member is disposed and secured over the opening in the wall of the module casing where the button member of said switches faces; wherein the front open end of the battery casing is threaded; wherein the front open end of the lens and reflector unit is threaded; and wherein both ends of the switching module are threaded so that the battery casing can be threadably mounted at one end of the module while the lens and reflector unit can be threadably mounted to the opposite end. ]

[ 7. The flashlight of claim 6 wherein the threaded ends of the switching module are axially aligned. ]

[ 8. The flashlight of claim 6 wherein the threaded ends of the switching module are disposed on axis spaced 90° apart. ]

[ 9. The flashlight of claim 6 wherein a gasket is added between the flexible boot member and the opening in the wall of the module casing so as to provide a watertight seal thereat. ]

[ 10. The flashlight of claim 9 wherein a gasket is added between each of the mating threaded mountings of the flashlight. ]

[11. The flashlight of claim 8 wherein a belt-clip is secured to the side of the switching module casing.]

[12. The flashlight of claim 6 wherein said battery casing has electrical contact means extending from the bottom of said battery casing to the vicinity of the front open end; wherein said lens and reflector has a contact shell mounted therein; and wherein said switching module has a first means for coupling the contact means at the vicinity of the front open end of the battery casing to the contact shell in the lens and reflector unit, a second means adapted for coupling the terminal of the lamp to the center terminal of a battery disposed adjacent the front open end of the battery casing, and wherein said switch controls at least one of said first and second means.]

*13. A waterproof flashlight comprising a battery casing provided with a front open end adapted to receive at least one battery and having contact means for electrically connecting the bottom vicinity of said battery casing to the vicinity of the front open end; a lens and reflector unit having a front open end and including a lens, a lens ring, a lamp holder containing contact means, and a lamp mounted therein; a switching module adapted at one end to be detachably mounted and watertightly sealed to the open end of the battery casing and adapted at the opposite end to be detachably mounted and watertightly sealed to the open end of the lens and reflector unit, said switching module comprising a module casing having a push button switch secured on a mounting bracket both of which are fixedly disposed wholly within the module casing with the button member of said switch aligned with an opening in the wall of the module casing and contact means adapted through activation of the push button switch for completing or interrupting an electrical circuit between the battery casing, the lens and reflector unit and at least one said battery when said battery is included in said battery casing; a flexible boot member disposed and secured over the opening in the wall of the module casing where the button member of said switches faces so as to provide a watertight seal thereat.*

*14. The waterproof flashlight of claim 13 wherein the front open end of the battery casing is threaded; wherein the front open end of the lens and reflector unit is threaded; and wherein both ends of the switching module are threaded so that the battery casing can be threadably mounted at one end of the module while the lens and reflector unit can be threadably mounted to the opposite end.*

*15. The waterproof flashlight of claim 14 wherein the threaded ends of the switching module are axially aligned.*

*16. The waterproof flashlight of claim 14 wherein the threaded ends of the switching module are disposed on axis spaced 90° apart.*

*17. The waterproof flashlight of claim 16 wherein a belt clip is secured to the side of the switching module.*

*18. The waterproof flashlight of claim 13 wherein said battery casing has electrical contact means extending from the bottom of said battery casing to the vicinity of the front open end; wherein said lens and reflector has a contact shell mounted therein; and wherein said switching module has a first means for coupling the contact means at the vicinity of the front open end of the battery casing to the contact shell in the lens and reflector unit, a second means adapted for coupling the terminal of the lamp to the center terminal of a battery disposed adjacent the front open end of the battery casing, and wherein said switch controls at least one of said first and second means.*

* * * * *